Dec. 22, 1959        S. EPSTEIN        2,918,053
HEATER VENT PIPE CONNECTOR CONSTRUCTION
Filed March 15, 1956
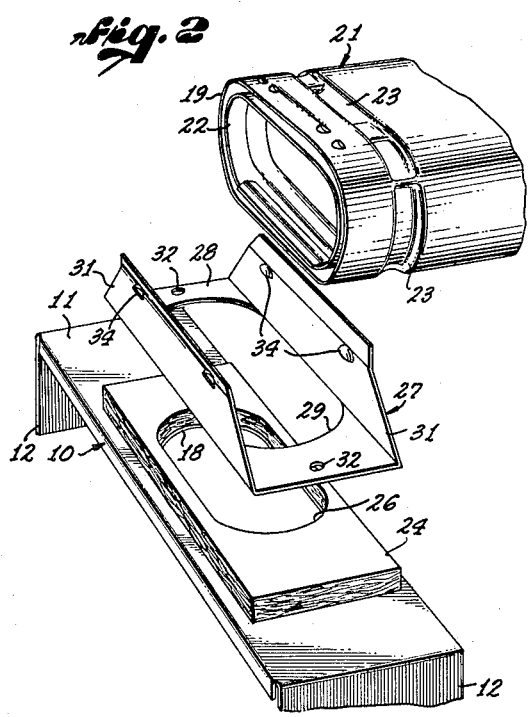
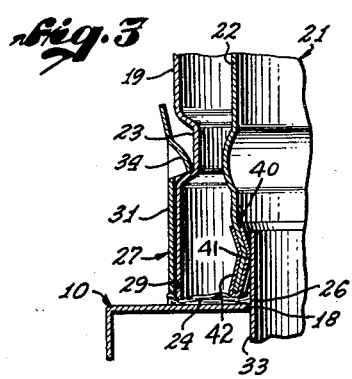
SAUL EPSTEIN,
INVENTOR.
HUEBNER, BEEHLER,
WORREL & HERZIG,
ATTORNEYS.

United States Patent Office 2,918,053
Patented Dec. 22, 1959

2,918,053

HEATER VENT PIPE CONNECTOR CONSTRUCTION

Saul Epstein, Los Angeles, Calif.

Application March 15, 1956, Serial No. 571,620

4 Claims. (Cl. 126—307)

This invention relates to an improved connector construction for joining the inlet end of a vent pipe system to a flue, and more particularly to such a connector construction wherein the joint between the vent pipe system and the flue can be made both rapidly and conveniently.

Connector means of this type should be designed and constructed for rapid and convenient installation without special installation methods or equipment. The joint between the inlet end of the vent pipe system and the outlet end of the flue should be capable of being made and unmade conveniently by hand in a very short time without the use of tools of any kind. In addition, the connecting pipes should be light in weight and rugged and durable in construction to keep manufacturing and maintenance costs at a minimum.

Furthermore, the connector construction should be designed to produce a safe, gas-tight joint without the use of caulking materials or sealing cements. The materials used in making the gas pipe connection should be resistant to heat and certainly non-inflammable to avoid dangers of ignition and resultant fire losses. In addition, the connector design should be such that a minimum number of parts are employed. The parts should be capable of being mass produced with a minimum amount of labor and with the employment of relatively inexpensive machinery or tools.

Accordingly, it is an important object of my invention to provide a vent pipe connector construction adapted for rapidly and conveniently establishing a joint between the inlet end of a vent pipe system and the outlet end of a flue.

Another object is to provide an improved vent pipe and flue connector construction adapted for rapidly and conveniently making a safe, gas-tight seal without the use of caulking materials or sealing cements.

A further object is to provide a vent pipe and flue connector construction wherein the connector employs a minimum number of parts, each of which is designed for low cost mass production employing a minimum amount of labor and inexpensive production machinery or tools.

Additional objects will become apparent from the following description:

In general terms, my invention comprehends a vent pipe and flue connector construction comprising a header plate means, a sealing gasket means, and a hold down plate means. The header plate means is provided with an aperture for receiving the exit end of a flue, such as a heater flue, for example. The sealing gasket means is made of a fire-resistant material, preferably including glass fibres, asbestos fibres, or the like, and is provided with an aperture to fit around the outside of the exit end of the flue. The width of the gasket means preferably is made sufficient to support the edge of the inlet end of the vent pipe system. In cases where a double wall vent pipe is employed, the width and configuration of the sealing gasket preferably is made to cover the edges, at the inlet end, of both the inner and outer walls of the vent pipe system to seal the same against gas leakage.

The hold-down plate is provided with an aperture to fit snugly around the outer wall at the inlet end of the vent pipe system. In the case of a double wall vent pipe, the aperture of the hold-down plate should fit snugly around the outer wall of the vent pipe at the inlet end. The hold-down plate preferably is provided with a bottom portion having the aperture for receiving the inlet end of the vent pipe system, and opposed side portions resiliently connected to the bottom portion. The side portions preferably are provided with tooth means for resiliently engaging indentation means formed on the wall, or outer wall, of a vent pipe, or double vent pipe section, respectively, so that the vent pipe section can be connected releasably by simply snapping the end of the vent pipe section into the hold-down plate, and disconnected by simply spreading apart the resilient, opposed side portions.

A more detailed description of a specific embodiment of my invention is given with reference to the drawing, wherein:

Figure 1 is a partial perspective view showing a specific embodiment of the connector construction employed to establish a joint between the outlet end of a flue and the inlet end of a vent pipe system in an interior wall;

Figure 2 is an exploded perspective view showing the parts of the connector and the vent pipe and flue in disassembled relationship; and Figure 3 is a vertical sectional view taken along line 3—3 of Figure 1 showing the connector, the inlet end of the vent pipe section and the outlet end of the flue in assembled relationship.

In the specific embodiment of my invention shown in the drawing, the connector is shown employed with a double wall vent pipe having a generally oval cross-section. It will be understood, however, that the connector of my invention can be used with a single wall vent pipe construction. It also will be understood that whether the vent pipe construction at the inlet end is single or double walled, the cross-sectional shape of the vent pipe and of the outlet end of the flue can be round, circular, oval, ellipsoidal, rectangular with rounded ends, rectangular with rounded corners, rectangular, square, or any other desired shape.

In the specific embodiment shown in the drawing, a header-plate 10, having a horizontal portion 11 and two vertical end bracket portions 12, is suitably secured at 13 between two vertical studs 14, at brackets 12. A plate spacer 16 is nailed between the studs 14, across two ceiling plates 17, cut out flush with the studs 14.

The horizontal portion 11, of the header plate 10, is provided with an aperture 18 having an outline made to fit around the outside surface of flue pipe section 33. The construction of the outer wall 19 and inner wall 22 of vent pipe section 21 is described in my co-pending application Serial Number 571,621, filed on March 15, 1956. Adjacent the inlet end of the vent pipe section 21, the outer wall 19 is provided with a series of annularly end-to-end indentations 23, as best shown in Figure 2.

A gasket 24, made of a suitable thickness of fire resistant material, preferably glass fibre, is provided with an aperture 26 approximating the outline of the outside surface of the outer wall of the inlet end of the vent pipe section. The gasket is placed on the upper surface of the horizontal portion 11 of the header plate 10. The aperture 26 of the gasket 24 is placed in registry with the aperture 18 of the header plate 10.

A hold-down plate 27 is made with a bottom portion 28 provided with an aperture 29 fitting snugly around the outside surface of the outer wall 19 of the inlet end of vent pipe section 21. Resiliently connected to the bottom portion 28 are opposed side portions 31 extending upwardly from the opposite sides of the bottom portion 28 of hold down plate 29. A screw hole 32 is formed at each opposite end of the horizontal portion 28 of hold-down plate 29 for fastening the hold-down plate in registry with apertures 18 and 26 of the hold-down plate and the sealing gasket, respectively.

The flue 33 extends upwardly through apertures 18 and 26, having the same cross sectional shape. Vent pipe section 21 and flue 33 engage telescopingly; header plate 10 is below the level of the telescoping engagement.

The connection between the inlet end of the vent pipe section 21 and the outlet end of the flue 33 is made by snapping the end of the vent pipe section into the hold-down plate, so that teeth 34, formed in the sides 31 of the hold-down plate, resiliently engage in the indentations 23. It will be observed that this operation is convenient and rapid and involves no tools whatsoever. The end of vent pipe section 21 can be just as easily removed from hold-down plate 27 by spreading the flexible side portions 31 until the teeth 34 become disengaged from indentations 23. This operation also can be conveniently done by hand without the use of any tools. Fig. 3 shows the assembled pipe and flue in cross section. The inner wall 22 of the vent pipe 21 near its end is bent inwardly transversely across the sides thereof as shown at 40 and is bent outwardly at 41 at an angle as shown to form an elongated angular indentation on each opposed side near the end transversely of the wall of the flue pipe 33. Strips 42 of U-shaped cross section having lengths substantially equal to the width of the straight portions of the inner wall 22 are folded around the edges of the inner wall 22 to envelop the edges as may be seen in Fig. 3. The strips 18 are stiffening strips attached to the straight portions of the inner wall 22 and they reinforce the inner wall sufficiently to avoid any tendency toward deformation of the inner wall by excessive inwardly directed pressures but at the same time do not stiffen or rigidify the inner wall at these zones sufficiently to hinder vent pipe joint assembly and disassembly operation. This structure corresponds to that in the above referred to copending application.

After the inlet end of the vent pipe section 21 has been snapped into position in hold-down plate 27, as described above, the sealing gasket 24 has been tightly compressed between the upper surface of the horizontal portion 11 of header plate 10 and the edges at the inlet ends of outer wall 19, inner wall 22, and the undersurface of horizontal portion 28 of hold down plate 27 to form a safe, gas-tight seal which prevents any flue gases from escaping from the vent pipe system to the outside atmosphere.

After the joint between the outlet end of flue 33 and the inlet end of vent pipe section 21 has been established by the connector construction, as described above, a second plate spacer 36 is fastened across the cut-out section of sealing plate 17, as indicated at 37. This firmly positions the vent pipe section 21 in the space between the studs 14 and assures a safe clearance between the vent pipe section and the walled surfaces. It will be observed that vent strapping is not necessary but may be employed if desired.

The flue pipe 33 may also be of a double-walled type as shown in the co pending application referred to.

While I have herein shown and described my invention in what I have conceived to be the most practical and preferred embodiment, it is recognized that departures can be made therefrom within the scope of my invention, which is not to be limited to the details disclosed herein, but is to be accorded the full scope of the claims so as to embrace any and all equivalent structure.

Having described my invention, what I claim as new and desire to secure by Letters Patent is:

1. In a vent pipe connector having telescopingly engaging flue pipe and vent pipe ends, means for connecting said ends in gas-tight vertical alignment which comprises a header plate and means to sustain the same horizontally in a position below the horizontal level of the telescopingly engaging flue and vent pipe ends, a centrally located opening in said header plate through which the flue pipe end extends, said opening having a peripheral edge conforming to and closely approximating the outer surface of said flue pipe end, a gasket disposed on said header plate around said opening, said gasket being comprised of heat-resistant fibrous material, a hold-down plate on said gasket, said hold-down plate having a central opening conforming to the outside wall of said vent pipe end telescopingly engaging the flue pipe end, means securing the hold-down plate to the header plate and a cooperating spring clip and shoulder means on the vent pipe and hold-down plate to detachably secure the vent pipe end to the hold-down plate in compressive gas-tight engagement with said gasket.

2. In a vent pipe connector including telescoped ends of a flue pipe and vent pipe means comprising in combination a header plate and means thereon to mount said header plate horizontally in a position adjacent to but below the level of horizontal engagement of the said flue and vent pipe ends, a centrally located opening in said header plate, the periphery of said opening and its size corresponding to the configuration and size of the outer surface of said flue pipe end and making a tight fit therewith, a heat resistant gasket comprised of fibrous materials disposed about the periphery of said opening and tightly conforming to the exterior surface of said flue pipe end, a hold-down plate overlying the outer area of said gasket and means securing said hold-down plate to the said header plate, a plurality of horizontally aligned indentations in the outer surface of the vent pipe in spaced relation to the end thereof, and a spring clip means mounted on said hold-down plate to engage said indentations to detachably secure the end of said vent pipe in gas-tight compressive engagement on said gasket.

3. In a vent pipe connector including the end of a vent pipe and the end of a flue pipe in gas-tight telescoped vertical alignment, said connector comprising a header plate and means on each end of the plate to mount said plate in a horizontal plane, a centrally located opening in said header plate, said opening having a size and configuration adapted to receive and pass therethrough in close fit the upper end of said exit end of a flue pipe, a gasket comprised of heat-resistant fibrous material disposed on the upper surface of said header plate about said opening and in contact with the outer surface of said flue pipe end, a hold-down plate seated over the outer surface of said gasket and means securing said hold-down plate to the header plate, and a spring clip means on the said hold-down plate engaging shoulders on the exterior surface of said vent pipe end to detachably secure the end of said vent pipe onto the said gasket in compressive gas-tight relationship thereto.

4. The connector means of claim 3, said spring clip means comprising vertically-upstanding flanges on opposite sides of said hold-down plate, said flanges being inclined inwardly from the side edges of the said hold-down plate to adjacent their opposite ends thereof and then flared outwardly, the inner surfaces of each said flange below and adjacent said flared ends being provided with a plurality of teeth extensions adapted to engage indentations in the outer surface of said vent pipe, said indentations being located in spaced relation to the bottom end of the said vent pipe in a transverse plane adapted to induce pressure engagement of the bottom end of said vent pipe with said gasket to form a gas-tight seal therebetween.

References Cited in the file of this patent

UNITED STATES PATENTS

| 1,197,813 | Frilick | Sept. 12, 1916 |
| 2,550,591 | Parsons | Apr. 24, 1951 |
| 2,718,841 | Kinkead | Sept. 27, 1955 |
| 2,808,825 | Solomon | Oct. 8, 1957 |

FOREIGN PATENTS

| 571,741 | Germany | Mar. 4, 1933 |